US008400651B2

(12) United States Patent
Miyata

(10) Patent No.: US 8,400,651 B2
(45) Date of Patent: Mar. 19, 2013

(54) INFORMATION ACQUISITION PROGRAM AND INFORMATION ACQUISITION APPARATUS FOR ACQUIRING INFORMATION FROM AN ELECTRONIC APPARATUS BASED ON A CONNECTION TO THE ELECTRONIC APPARATUS

(75) Inventor: Yuji Miyata, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1234 days.

(21) Appl. No.: 11/476,570

(22) Filed: Jun. 29, 2006

(65) Prior Publication Data

US 2007/0013933 A1    Jan. 18, 2007

(30) Foreign Application Priority Data

Jun. 29, 2005   (JP) .................................. 2005-190132

(51) Int. Cl.
G06F 3/12 (2006.01)

(52) U.S. Cl. ...................................... 358/1.15; 358/1.13

(58) Field of Classification Search .................. 358/1.13, 358/1.15
See application file for complete search history.

(56) References Cited

U.S. PATENT DOCUMENTS

| 5,974,474 | A | * | 10/1999 | Furner et al. ....................... 710/8 |
| 6,210,051 | B1 | * | 4/2001 | Sakurai ............................ 400/62 |
| 6,822,753 | B1 | * | 11/2004 | Momose ....................... 358/1.13 |
| 2003/0142351 | A1 | * | 7/2003 | Sakura .......................... 358/1.15 |
| 2004/0107855 | A1 | * | 6/2004 | Kizaki et al. ................... 101/484 |
| 2005/0018242 | A1 | * | 1/2005 | Azami .......................... 358/1.15 |
| 2005/0146732 | A1 | * | 7/2005 | Kizaki et al. .................... 358/1.6 |
| 2005/0151988 | A1 | * | 7/2005 | Suto ............................... 358/1.13 |
| 2005/0270587 | A1 | * | 12/2005 | Yamakawa et al. ............. 358/448 |
| 2006/0209328 | A1 | * | 9/2006 | Anderson et al. ............. 358/1.13 |
| 2006/0212272 | A1 | * | 9/2006 | James ........................... 702/188 |

FOREIGN PATENT DOCUMENTS

JP    6-87548 A    3/1994
JP    2001-117834 A    4/2001

* cited by examiner

*Primary Examiner* — Benjamin O Dulaney
(74) *Attorney, Agent, or Firm* — Baker Botts L.L.P.

(57) ABSTRACT

An information acquisition apparatus is for acquiring information, which a connected electronic apparatus has, from the connected electronic apparatus. The information acquisition apparatus includes a connection port, a component-to-be-used determining unit, and a read back unit. The electronic apparatus is connected to the connection port. The component-to-be-used determining unit determines a component tool to be used for acquiring the information, based on a type of connection port to which the electronic apparatus is connected, and a type of information. The read back unit acquires the information by making an operation of the component tool determined by the component-to-be-used determining unit.

20 Claims, 12 Drawing Sheets

FIG. 8

| i | CONNECTION METHOD | INFORMATION TYPE | COMPONENT TO BE USED | TIME-OUT |
|---|---|---|---|---|
| 1 | LPT | OPTION INFORMATION | COMPONENT A | 20 SEC. |
| 2 | | COLOR CORRECTION INFORMATION | COMPONENT A | 40 SEC. |
| 3 | USB | OPTION INFORMATION | COMPONENT B | 10 SEC. |
| 4 | | COLOR CORRECTION INFORMATION | COMPONENT B | 20 SEC. |
| 5 | NETWORK | OPTION INFORMATION | COMPONENT C | 10 SEC. |
| 6 | | COLOR CORRECTION INFORMATION | COMPONENT D | 20 SEC. |

FIG. 9

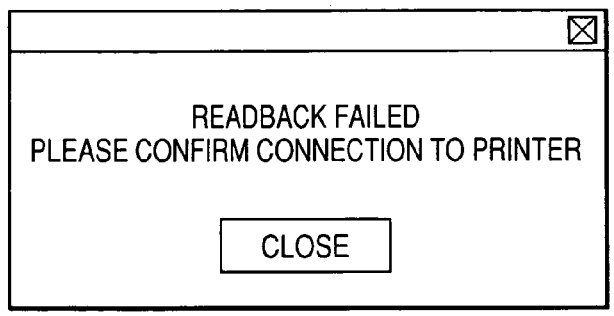

READBACK FAILED
PLEASE CONFIRM CONNECTION TO PRINTER

CLOSE

FIG. 10

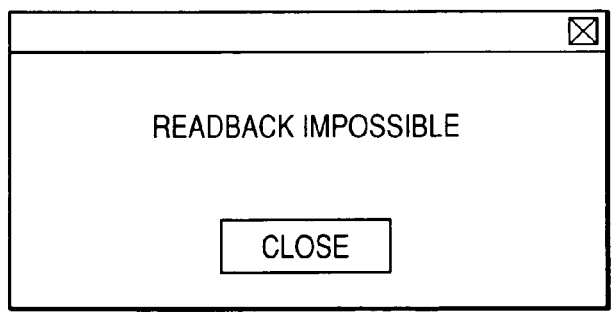

READBACK IMPOSSIBLE

CLOSE

INFORMATION ACQUISITION PROGRAM AND INFORMATION ACQUISITION APPARATUS FOR ACQUIRING INFORMATION FROM AN ELECTRONIC APPARATUS BASED ON A CONNECTION TO THE ELECTRONIC APPARATUS

CROSS REFERENCE TO RELATED APPLICATION

This application claims priority from Japanese Patent Application No. 2005-190132, filed on Jun. 29, 2005, the entire subject matter of which is incorporated herein by reference.

TECHNICAL FIELD

Aspects of the present invention relate to an information acquisition program and an information acquisition apparatus for acquiring information which an electronic apparatus connected to a computer has. Aspects of the invention are applicable to acquire information which an image forming apparatus such as a printer has.

BACKGROUND

Option information such as presence/absence of an additional tray and presence/absence of a duplex printing unit is sometimes different from each other even if the model numbers of printers are the same.

Further, since adhesion conditions of a toner or ink are slightly different from each other even if the model numbers of the printers are the same, each printer sometimes stores color correction information as unique information in order to correct those errors.

The information unique to the printers is read (read back) by a readback tool installed in the computer, and option setting or the like is executed at the computer side based on the read information unique to the printer (e.g. see JP-A-6-87548).

SUMMARY

A readback tool is constituted by one or more component tools, and the component tools are different from each other depending on a connection method of a computer and a printer or the type of information to be acquired.

That is, for example, a component tool used for a connection method using a USB (Universal Serial Bus) port is generally different from that used for a connection method using a LAN (Local Area Network) port in a connection method of the computer and the printer. Similarly, a component tool used in a case where the acquired information is option information is sometimes different from that used in a case where the acquired information is color correction information.

However, in the technique disclosed in JP-A-6-87548, since a component tool to be used is determined only based on the connection method, information unique to the printer such as option information and color correction information cannot be acquired (read back) for the printers in which the component tools to be used are different from each other for every type of information to be acquired.

Aspects of the present invention provide an information acquisition program and an information acquisition apparatus capable of reliably acquiring information which an electronic apparatus connected to a computer such as a printer has.

According to an aspect of the invention, there is provided an information acquisition program product for enabling a computer to acquire information which an electronic apparatus connected to the computer has, the computer including: software instructions for enabling the computer to perform predetermined operations; and a computer readable medium bearing the software instructions, the predetermined operations including the steps of: determining a component tool used for acquiring the information based on a connection method of the computer and the electronic apparatus and a type of information; and acquiring the information by making the determined component tool to operate.

Since the component tool is determined in consideration of the type of information to be acquired in addition to the connection method, a more suitable component is determined compared with a conventional information acquisition program which determines a component depending on only a connection method, and the information can be reliably acquired which the electronic apparatus connected to the computer has.

BRIEF DESCRIPTION OF THE DRAWINGS

FIG. 1 is a block diagram showing a network constituted by an information acquisition apparatus (computer) according to an aspect of the invention, a printer and the like;

FIG. 8 is a table showing a relationship between the component tool to be used and a determination condition thereof;

FIG. 9 is a view showing a warning message;

FIG. 10 is a view showing a warning message;

DETAILED DESCRIPTION

Aspects of the present invention will be described hereinafter with reference to the accompanying drawings.

In the aspects, an information acquisition program and an information acquisition apparatus are applied to control of a network printer connected thereto via a network such as a LAN and a local printer connected to a USB port, a printer port or the like provided on a computer. That is, in the aspects, the information acquisition program is incorporated (installed) in the computer, and thereby the computer is made to function as the information acquisition apparatus.

(First Aspect)

1. The Summary of the Information Acquisition Apparatus, etc.

Figure 1:
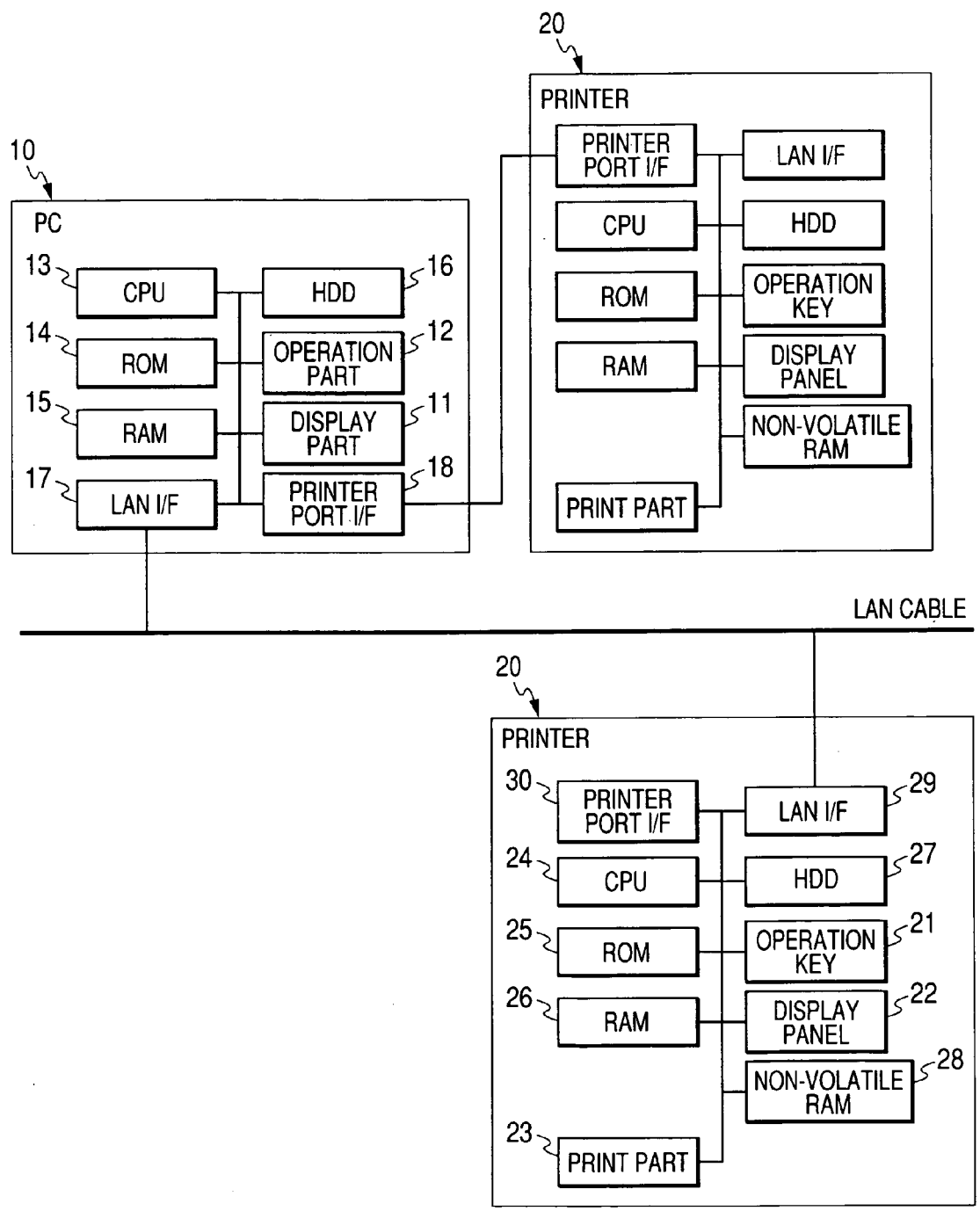

FIG. 1 is a block diagram showing an outline of the network constituted by an information acquisition apparatus (computer) 10, a printer 20 and the like. The outline of the constitution of the information acquisition apparatus 10 will be described with reference to FIG. 1.

The configuration of the information acquisition apparatus 10 is the same as that of a general computer. That is, the information acquisition apparatus (computer) 10 is constituted by: a display part 11 constituted by an LCD (Liquid Crystal Display), a CRT (Cathode Ray Tube) or the like which displays an image and characters; an operation part 12 constituted by a mouse (not shown) and a key board (not shown) and the like which serve as a pointing unit for shifting a pointer (not shown) which points a specific part of the display part 11; a CPU (Central Processing Unit) 13; a ROM (Read Only Memory) 14; a RAM (Random Access Memory) 15, an HDD (Hard Disk Drive) 16; a network interface (LAN I/F) 17 which connects the information acquisition apparatus (computer) 10 to a network; a printer port interface 18 which connects a printer 20; and the like. Moreover, the information acquisition apparatus (computer) 10 will be referred to as PC 10 hereinafter.

Additionally, the printer 20 is constituted by: an operation key 21 for selecting any of the functions provided in the printer 20; a display panel 22 for displaying an operation content, a working status or the like; a print part 23 for printing the characters, the image or the like on a recording medium such as a sheet; a CPU 24; a ROM 25; a RAM 26; an HDD 27; a non-volatile RAM 28 capable of holding a recorded content even if supply of power is stopped; a network interface (LAN I/F) 29 for connecting the printer 20 to the network; a printer port interface 30 for directly connecting the printer 20 to the PC 10 without the LAN; and the like.

Moreover, in the present aspect, the printer 20 shown in the upper part of FIG. 1 is directly connected to the PC 10 with the printer interface 30, and the printer 20 shown in the lower part thereof is connected to the PC 10 via the LAN.

2. Operation of Information Acquisition Program (Information Acquisition Apparatus)

As for operation of a program (readback tool) for acquiring unique information such as option information and color correction information, which the printer 20 has, in the PC 10, a case of acquiring the option information will be described as an example hereinafter.

Incidentally, in the present aspect, Windows (registered trademark) is employed as an OS (Operating system) of the PC 10, and terms to which no explanations (definitions) are attached are used with general meanings in Windows.

Figure 2:
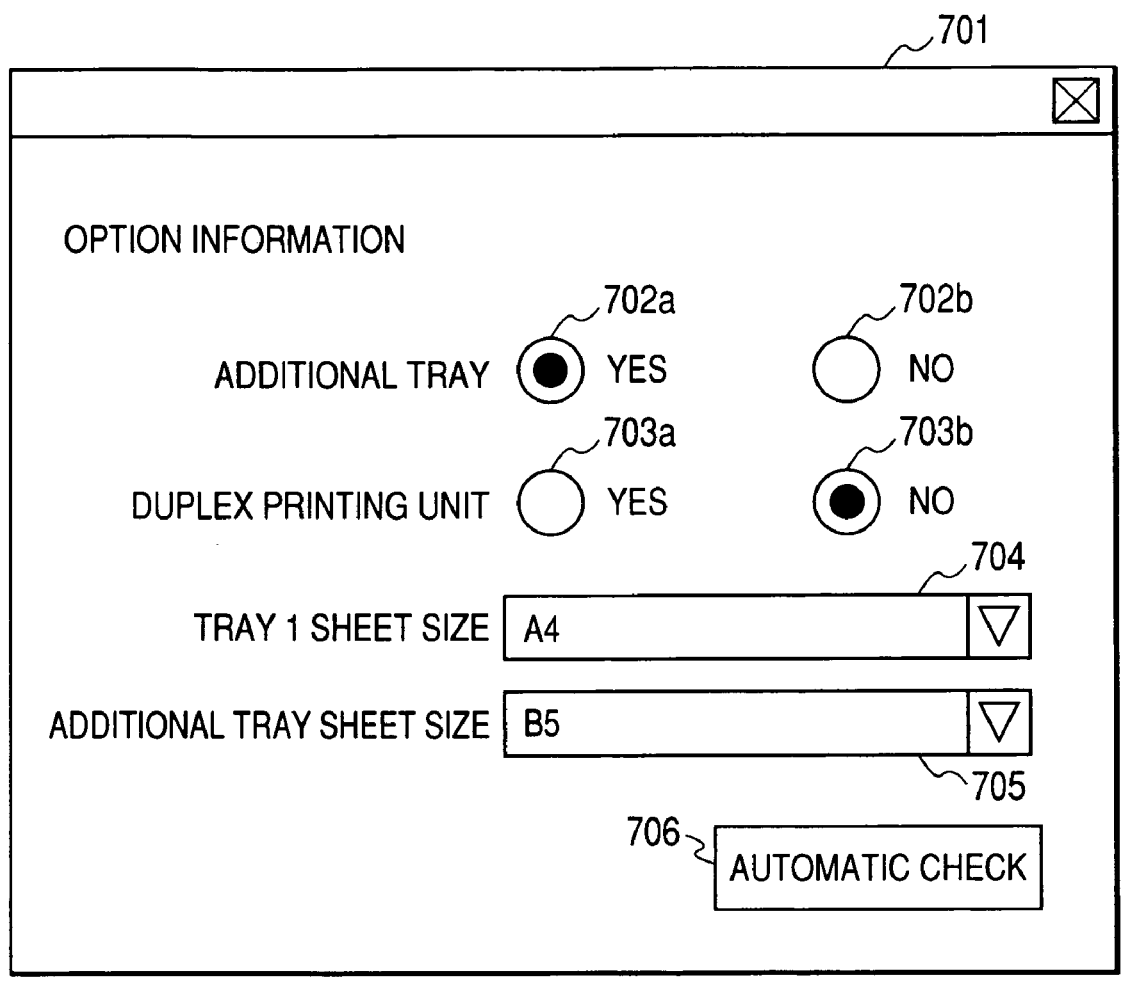
FIG. 2 is a view showing an example of an option information setting user interface.
Figure 3:
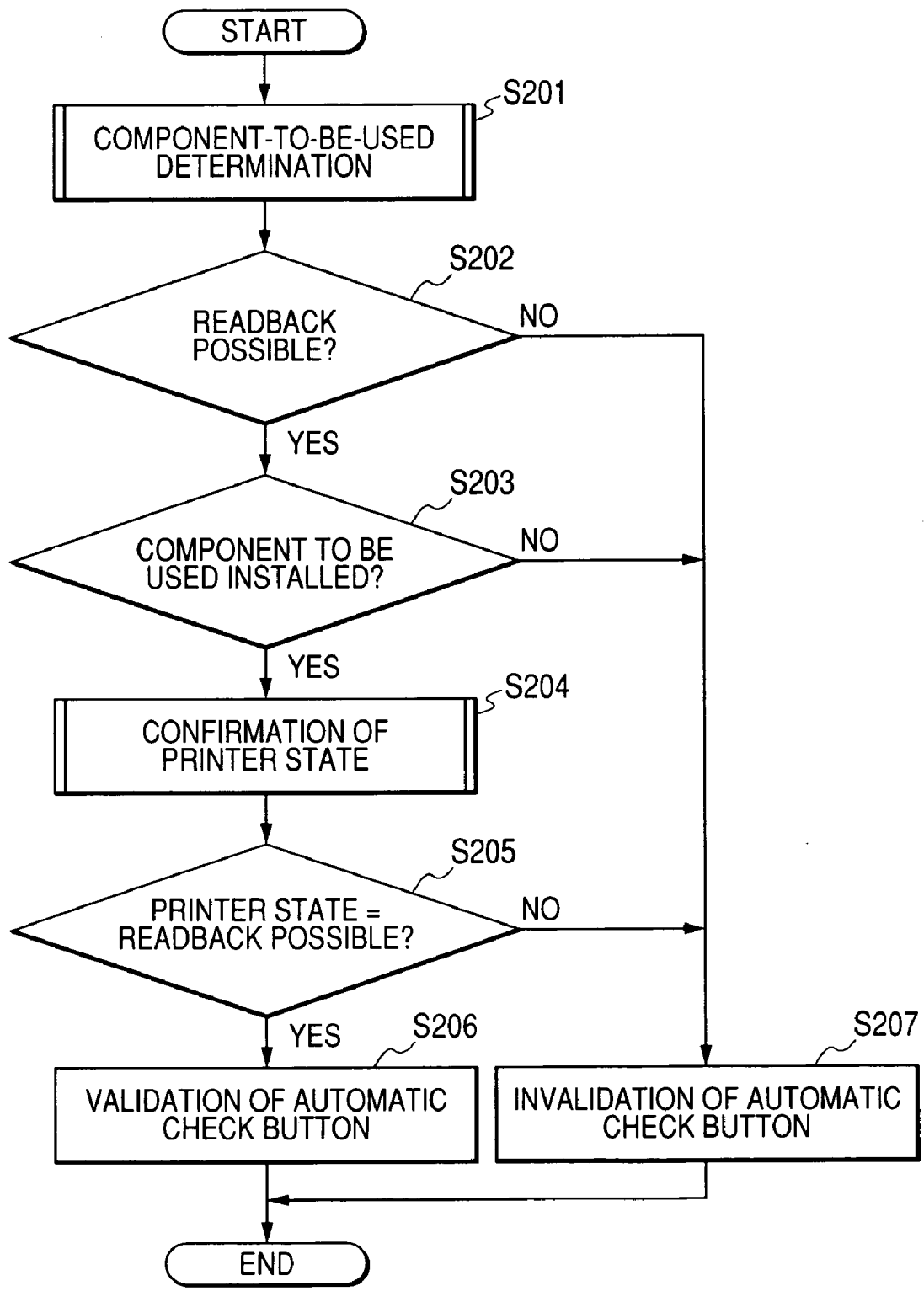
FIG. 3 is a flowchart showing an outline of a program which is executed when a user interface for starting a readback tool is displayed.
Figure 4:
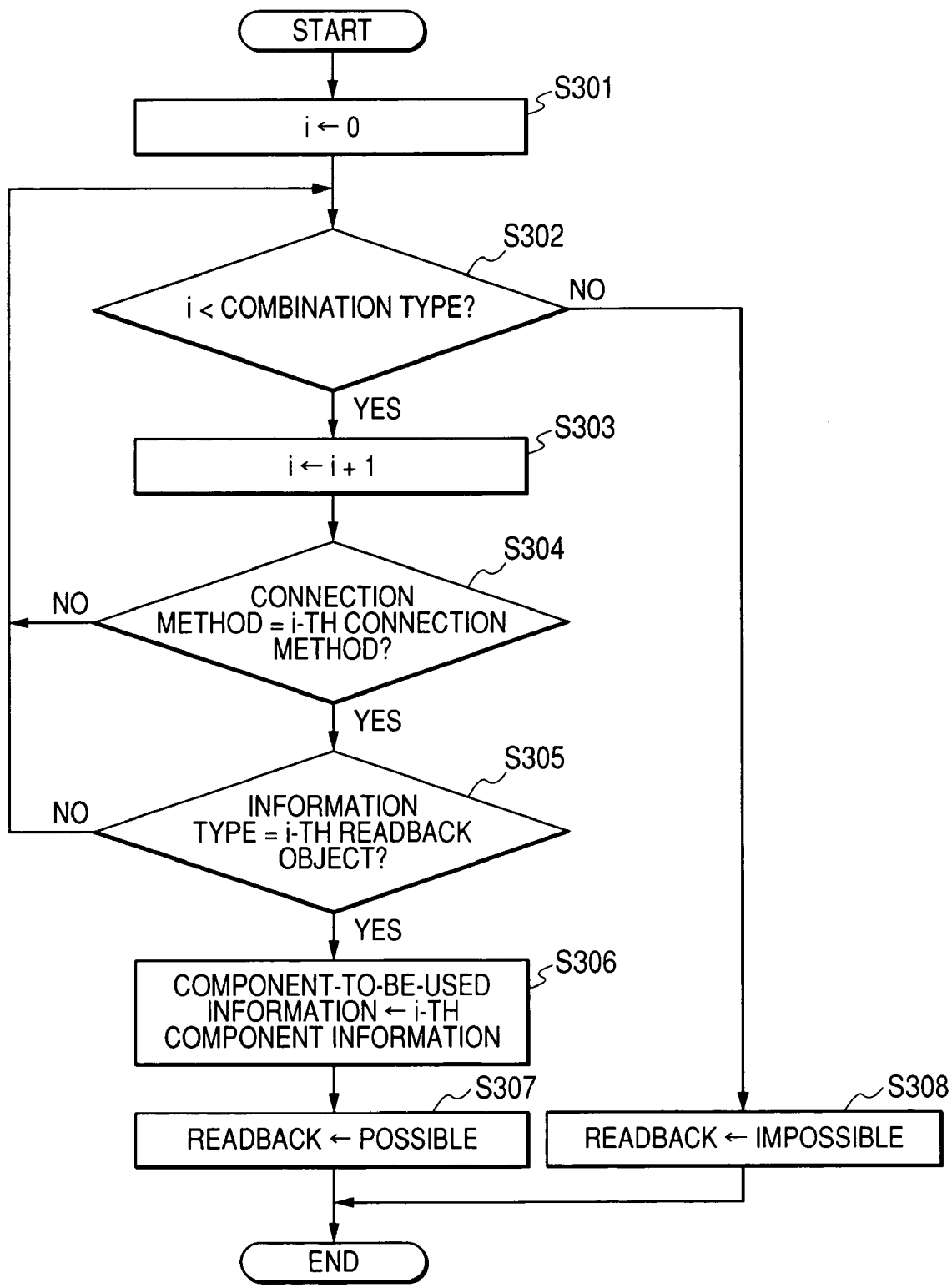
FIG. 4 is a flowchart showing an outline of a control flow for determining a component tool to be used.
Figure 5:
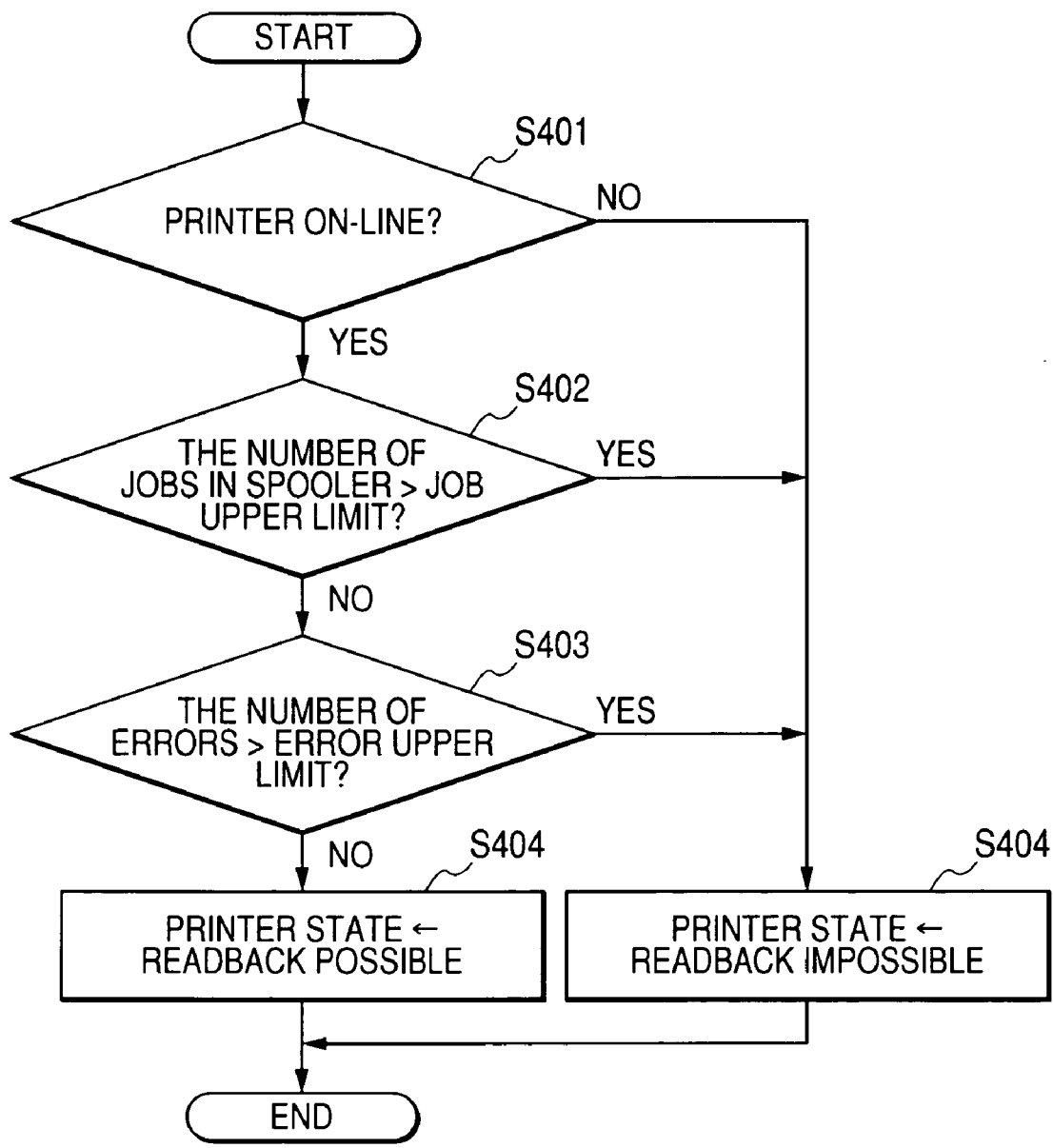
FIG. 5 is a flowchart showing an outline of a control flow for confirming a state of a printer.

FIG. 2 shows an example of a window (referred to as option information setting user interface 701 hereinafter) displayed on the display part 11 so that the option information is set, and a readback tool for acquiring the option information (simply referred to as readback tool hereinafter) starts by pressing of an automatic check button 706. FIG. 3 to FIG. 5 are flowcharts showing the programs which are executed when the readback tool is activated, respectively.

The option information setting user interface 701 is an input window for setting an optional function capable of being used in the printer 20 usable to the PC 10, and it is generally started by selection of the option information setting displayed on the properties of the printer.

A setting unit and a functioning unit are displayed on the option information setting user interface 701. The setting unit includes radio buttons 702a and 702b for setting presence/absence of an additional tray, radio buttons 703a and 703b for setting presence/absence of a duplex print unit, a combo box 704 for setting the size of sheet mounted on a standard sheet feed tray, a combo box 705 for setting the size of sheet mounted on the additional tray, and the like. The functioning unit includes an automatic check button 706 for automatically setting these setting contents with the readback tool, etc.

2.1. Readback Tool Start User Interface Control Flow

FIG. 3 is a flowchart showing main control which is executed when the user interface for starting the readback tool is displayed. When the user interface for starting the readback tool is displayed, a program (component tool) used for acquiring the option information from the printer 20 is first determined (S201). Moreover, details of a method for determining the component tool to be used will be described later.

As a result of determination of the component tool to be used, it is determined whether read back is possible (S202). When the readback is possible (S202: YES), it is determined whether the determined component tool is actually stored in a storage device controllable by the CPU 13 such as the HDD 16, that is, whether the determined component tool is installed (S203).

Here, when it is determined that the determined component tool is installed (S203: YES), a state of the printer 20 is confirmed (S204) and it is determined whether the printer 20 is in a state where the readback (information acquisition) is possible (S205). Moreover, details of a method for confirming the state of the printer 20 will be described later.

When it is determined that the printer is in the state where the readback is possible, that is, when a flag, etc., indicating that the readback is possible by the printer state confirmation control described later is set (S205: YES), the automatic check button 706 is made to be in a state where it can be pressed (made to operate) (S206).

On the other hand, when it is determined that the readback is impossible in S202 (S202: NO), when the component tool determined in S203 is not installed (S203: NO), or when it is determined that the printer is in a state where the readback is impossible in S205 (S205: NO), the automatic check button 706 is made to be in a state where it cannot be pressed (made to operate) (S207).

Moreover, in the present aspect, when the automatic check button 706 is made to be in a state where it cannot be pressed, the whole automatic check button 706 is displayed gray and starting the readback tool becomes impossible.

2.2. Determination of Component Tool to be Used

FIG. 4 is a flowchart showing an outline of a control flow for determining the component tool to be used, and FIG. 8 is a table showing the relationship between the component tool to be used and a determination condition thereof.

As shown in FIG. 8, the component tool to be used varies depending on a connection method of the printer 20 and the PC 10, that is, the printer 20 is either connected to the PC 10 via the LAN (Network) or directly connected to the printer port interface (LPT) 18 or the USB port of the PC 10, and information to be acquired (readback object).

Moreover, in FIG. 8, since there are three types of connection methods and two types of information (read back object), there are six types of component tools at maximum. However, in the present aspect, since the same components can be used without depending on the type of information when the printer 20 is connected to the LPT port or the USB port, there are four types of component tools, A to D.

Incidentally, in the present aspect, when the component tool to be used is determined, time (time-out time) to actually execute the readback is determined in accordance with the determination. And, as described later, the readback operation stops at a point in time when the time-out time elapses.

Determination control of the component tool to be used will be described hereinafter with reference to the flowchart shown in FIG. 4.

First, the variable i indicating a counter is set as zero (S301). Next, it is determined whether the variable i is smaller than the combination number (6 in the present aspect) (S302).

Moreover, the variable i means any one of the combinations (6 in the present aspect) determined depending on the types of connection method and the types of information. For example, in FIG. 8, the variable i is 1, which means a combination of the connection method which is a method for directly connecting the component tool to the LPT and the type of information which is option information.

Therefore, determining whether the variable i is smaller than the combination number means determination of whether all combinations determined depending on the types of connection method and the types of information are checked in the determination of the component tool to be used.

When it is determined that the variable i is smaller than the combination number in S302 (S302; YES), it is determined whether the current connection method is the same as the i-th connection method in the table of FIG. 8 (S304) after 1 is added to the current variable i (S303).

Here, when it is determined that the current connection method is the same as the i-th connection method in the table of FIG. 8 (S304: YES), it is determined whether the type of information to be acquired is the same as the type of i-th information in the table of FIG. 8 (S305).

When it is determined that the type of information to be acquired is the same as the type of i-th information in the table of FIG. 8 (S305: YES), a fact the i-th component tool in the table of FIG. 8 corresponds to the component tool to be used and the time-out time according to the component tool to be used are stored in the RAM 15 (S306), and a flag, etc., meaning the readback is possible is set to the RAM 15 (S307). Thereafter, the control flow ends and returns to the main control flow.

Therefore, for example, since the case where the information to be acquired is the option information and the connection method is the network that corresponds with the condition in the case where the variable i is 5, the component to be used becomes the component C, the time-out becomes 10 seconds and the component information is stored in the RAM 15.

On the other hand, when it is determined that the current connection method is not the same as the i-th connection method in the table of FIG. 8 (S304: NO), or it is determined that the type of information to be acquired is not the same as the type of the i-th information in the table of FIG. 8 (S305: NO), it is determined again whether the variable i is smaller than the combination number in S302.

Here, when the variable i becomes 6 or more (S302: NO), that is, the corresponding combination of the type of connection method and the type of information is not found among the whole combinations shown in the table of FIG. 8, a flag, etc., is set to the RAM 15 (S308), the flag meaning the read back is impossible. Thereafter, the present control flow ends and returns to the main control flow.

Moreover, in the main control flow (S202), it is determined whether the readback is possible based on the flag set in S307 or S308.

2.3. Printer Status Confirmation Processing

FIG. 5 is a flowchart showing an outline of a control flow for confirming a state of the printer 20. The printer status confirmation processing will be described hereinafter with reference to the flowchart.

First, it is determined whether the printer 20 is in an on-line state, transfer of signals between the printer 20 and the PC 10 is possible (S401). When it is determined that the printer 20 is not in the on-line state. When the printer 20 is in an off-line state (S401: NO), an instruction (command) for acquiring the information cannot be transmitted to the printer 20. Therefore, a flag is set to the RAM 15 (S405), the flag indicating that the printer is in the state where the readback is impossible. Thereafter, the present control flow ends and returns to the main control flow.

On the other hand, when it is determined that the printer 20 is in the on-line state (S401: YES), it is determined whether the number of printing jobs in a spooler exceeds an upper limit value (S402).

Here, the spooler is a part (memory) for storing jobs to be subjected to printing processing, and the jobs stored in the spooler are transmitted to the printer 20 in the stored order. Thus, if many printing jobs have already been stored in the spooler at a point in time when the instruction for acquiring the information is transmitted to the printer 20, the information to be acquired (option information in this case) cannot be immediately acquired because a readback instruction is not immediately transmitted and executed.

Then, in the present aspect, when it is determined that the number of jobs stored in the spooler exceeds the preset upper limit value (S402: YES), a flag is set to the RAM 15 (S405), the flag indicating that the printer is in the state where the readback is impossible. Thereafter, the present control flow ends and returns to the main control flow.

When it is determined that the number of jobs stored in the spooler does not exceed the upper limit value (S402: NO), it is determined whether the number of errors exceeds a preset upper limit value (S403).

Here, the error means failure of acquisition of the information in the case where the readback processing described later is executed, and the number thereof increases every failure of the readback. Therefore, the possibility is high that there exists a factor for making the readback impossible in items other than the items confirmed in S401 or 3402, in the case where there are many errors.

Thus, in the present aspect, when it is determined that the number of errors exceeds the preset upper limit value (S403: YES), the flag is set to the RAM 15 (S405), the flag indicating that the printer is in the state where the readback is impossible.

Moreover, in the present aspect, the number of errors is reset as an initial value (0) when the option information setting user interface 701 is closed.

When it is determined that the number of errors does not exceed the preset upper limit value (S403; YES), the flag is set to the RAM 15 (S404), the flag indicating that the readback is possible. Thereafter, the present control flow ends and returns to the main control flow.

Moreover, in the main control flow (S205), it is determined whether the printer is in the state where the readback is possible based on the flag set in S404 or S405.

Incidentally, in the present aspect, although it is determined whether the printer 20 is in the on-line state, it may be determined whether the printer 20 is stopping temporarily or running.

Additionally, in the present aspect, although the upper limit is determined based on the number of jobs, in place of this, the upper limit may be determined based on the total size of jobs.

2.4. Automatic Check Processing

Figure 6:
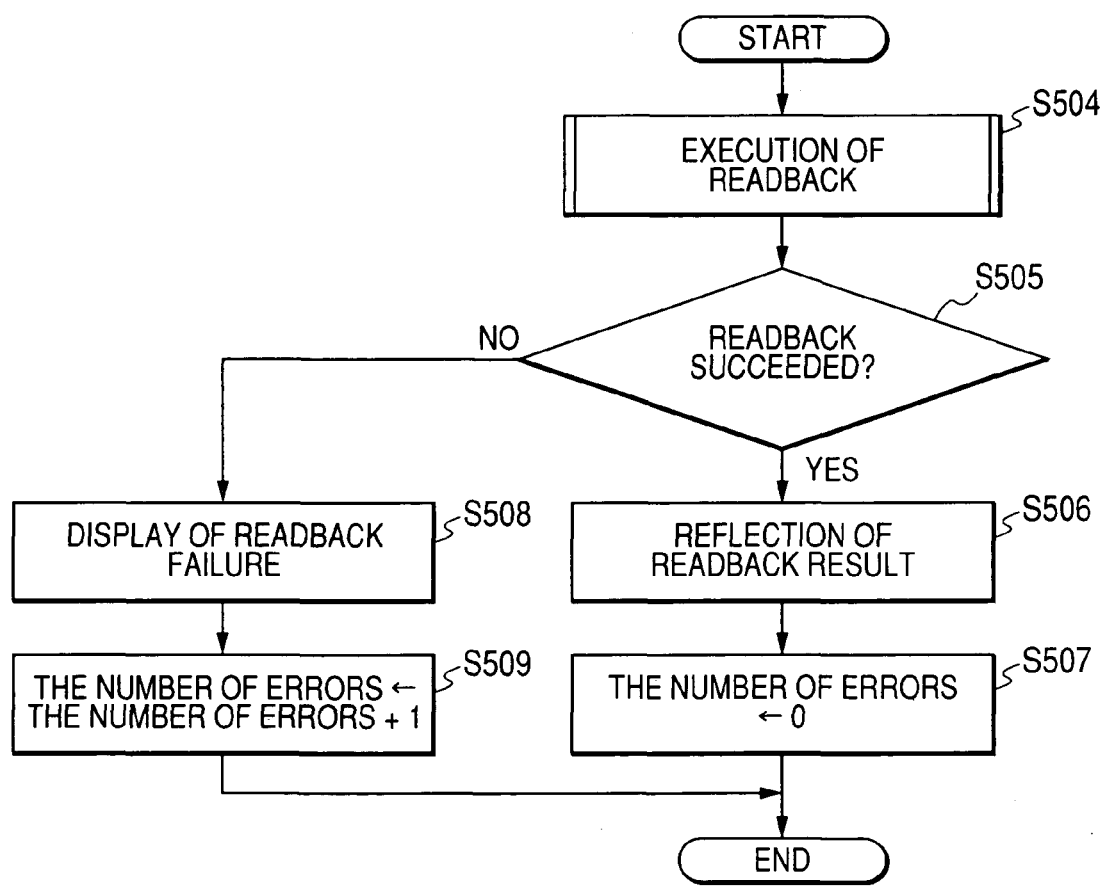
FIG. 6 is a flowchart showing an outline of a processing which is executed when an automatic check button is pressed.

FIG. 6 is a flowchart showing an outline of a processing which is executed when the automatic check button 706 is pressed in a state where the automatic check button 706 can be pressed. The outline of the automatic check processing will be described hereinafter.

When the automatic check button 706 is pressed, the readback processing is executed (S504) as shown in FIG. 6. Moreover, details of the readback processing (S504) will be described later.

When the readback processing ends, it is determined whether the readback (information acquisition) has succeeded (S505). When it is determined the readback has succeeded (S505: YES), the acquired information contents is reflected on the option information setting user interface 701 (S506) and zero is substituted for the number of errors currently stored in the RAM 15 (S507). Thereafter, the control flow ends and returns to the main control flow.

On the other hand, when it is determined that the readback has failed (S505: NO), a warning which means the failure of the readback (see FIG. 9) is displayed on the window (S508) and 1 is added to the number of errors currently stored in the RAM 15 (S509). Thereafter, the control flow ends and returns to the main control flow.

2.4.1. Readback Processing (S504)

Figure 7:
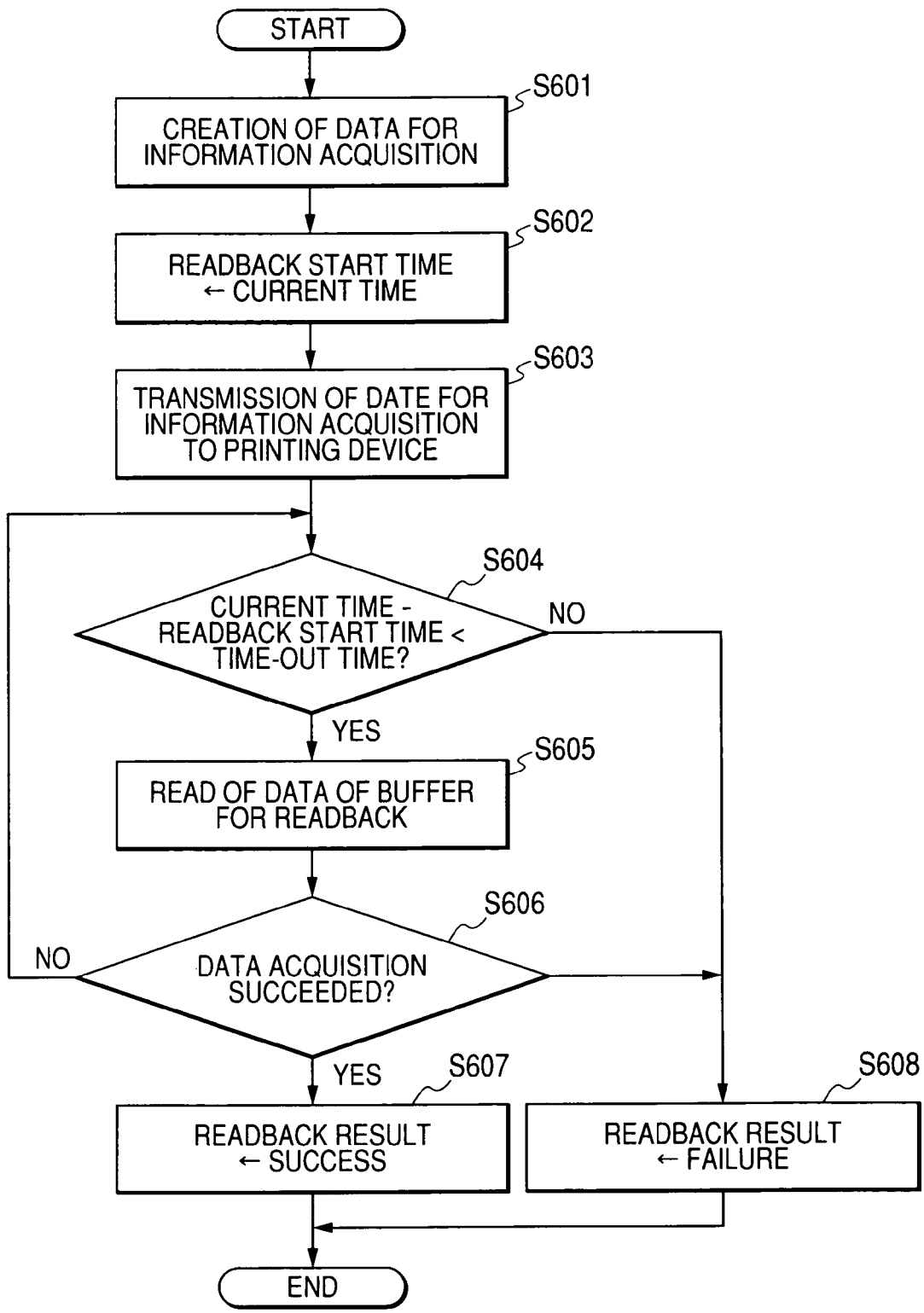
FIG. 7 is a flowchart showing an outline of a readback processing.

FIG. 7 is a flowchart showing an outline of the readback processing. The outline of the readback processing will be described hereinafter.

First, data for information acquisition for acquiring the acquired information is created (S601). Moreover, the data for information acquisition is constituted by character strings (text data) preset for every type of printer and varies depending on information to be acquired.

When the creation of the data for information acquisition ends, the current time is stored in the RAM 15 as a readback start time (S602) and the data for information acquisition created in S601 is transmitted to the printer 20 (S603).

Thereafter, the processing stands by until a result (information) to the transmitted data for information acquisition is outputted from the printer 20 or the time-out time elapses from the time stored in S602. If the time-out time has elapsed from the time stored in S602 (S604: NO), a flag which means the failure of the readback is set to the RAM 15 (S606). Thereafter, the control flow ends and returns to the automatic check processing.

Incidentally, the reason why the time-out times are different from each other is that the amount of the acquired information varies depending on the type of information to be acquired and times necessary for transmitting such an amount of the information via the connection method are different from each other.

On the other hand, reading of data read back from a buffer for readback reserved in the RAM 15 is executed (S605) while the time-out time does not elapse from the time stored in S602. Moreover, the information outputted from the printer 20 is written in the buffer for readback.

It is determined whether the data can be acquired from the buffer for readback, that is, whether the information is written in the buffer for readback (S606). When it is determined that the data cannot be acquired (S606: NO), the step returns to S604 and it is determined again whether the time-out has elapsed.

On the other hand, when it is determined that the data has been acquired, a flag which means the readback has succeeded is set to the RAM 15 (S607). Thereafter, the control flow ends and returns to the automatic check processing.

Moreover, in the automatic check processing (S505), it is determined that the readback has succeeded based on the flag set in S607 or S608.

3. Characteristics of Information Acquisition Program and Information Acquisition Apparatus According to the Present Aspect In the present aspect, since the component tool is determined in consideration of the type of information to be acquired in addition to the connection method, a more suitable component is determined compared with a conventional information acquisition program which determines a component depending on only the connection method. Therefore, the information can be reliably acquired which the printer 20 connected to the PC 10 has.

Additionally, when it is determined that the component tool to be used is not installed in the PC 10, pressing of the automatic check button 706 is made impossible, etc., so that the information cannot be acquired. Therefore, when the corresponding component tool is not installed in the PC 10, the user can prevent beforehand a useless attempt to acquire the information of the printer 20.

Additionally, it is checked whether the printer 20 is in the on-line state, and thereupon it is determined whether the pressing of the automatic check button 706 is made possible or impossible. Therefore, the user can prevent before hand a useless attempt to acquire the information of the printer 20 when the printer 20 is not communicably connected to the PC 10.

Additionally, when the number of jobs stored in the spooler exceeds the preset upper limit value, the pressing of the automatic check button 706 is made impossible. Therefore, the user can prevent beforehand a useless attempt to acquire the information of the printer 20 when a load to the printer 20 increases.

Additionally, when the number of errors exceeds the preset upper limit value, the pressing of the automatic check button 706 is made impossible. Therefore, the user can prevent beforehand a useless attempt to acquire the information of the printer 20 in a case where the possibility that any troubles arise in the printer 20 is high.

By the way, there are many cases where it takes more time to determine the state of the printer 20 than to determine the component tool to be used.

Therefore, when the state of the printer 20 is determined after the component tool to be used is determined like the present aspect, it can be effectively determined whether the information of the printer 20 can be acquired.

That is, the information of the electronic apparatus cannot be acquired in both cases where the printer 20 is in the state where the readback processing is hardly possible and where it is determined that the component tool to be used is not installed in the computer.

When the state of the printer 20 is determined after the component tool to be used is determined, it is determined that the readback is impossible at a point in time when the component tool to be used is not installed in the computer, and the time necessary for determining the component tool to be used is shorter than the time necessary for determining the state of the printer 20.

Therefore, when the state of the printer 20 is determined after the component tool to be used is determined, it can be effectively determined whether the information of the printer 20 can be acquired.

Additionally, the component tool suitable for determining the state of the printer 20 is sometimes necessary in some type of printer 20. Therefore, when the state of the printer 20 is determined after the component tool to be used is determined like the present aspect, the state of the printer 20 can be reliably determined.

As shown in FIG. 8, although the component tool to be used varies depending on the connection method, there are many cases where the component tool to be used does not vary even if the type of information varies.

Therefore, when the determination of the connection method (S304) is executed in advance of the determination of the types of information (S305) like the present aspect, the component tool to be used can be effectively determined.

Moreover, in the present aspect, when the user erroneously operates the automatic check button 706 when the pressing of the automatic check button 706 is impossible, a warning indicating that an automatic setting function does not operate (see FIG. 10) may be displayed.

Further, in the present aspect, for example, the warning may always be displayed when the pressing of the automatic check button 706 is impossible.

In the present aspect, S201 functions as a component-to-be-used determining unit; S203 functions as an installation determining unit; S504 functions as a readback unit; S207 functions as a readback prohibiting unit; and S204 functions as a connection state inspecting unit.

(Second Aspect)

In the first aspect, the determination of the component tool to be used and the determination of presence/absence of the determined component tool (S201, S202), and the determination whether the determined component tool to be used is installed in the PC 10 (S203), are executed at the time when the option information setting user interface 701 is activated. In the present aspect, as shown in FIG. 11 and FIG. 12, the determination of the component tool to be used and the determination of presence/absence of the determined component tool (S201, S202), and the determination whether the determined component tool to be used is installed in the PC 10 (S203), are executed at the time when the automatic check button 706 is pressed.

Figure 11:
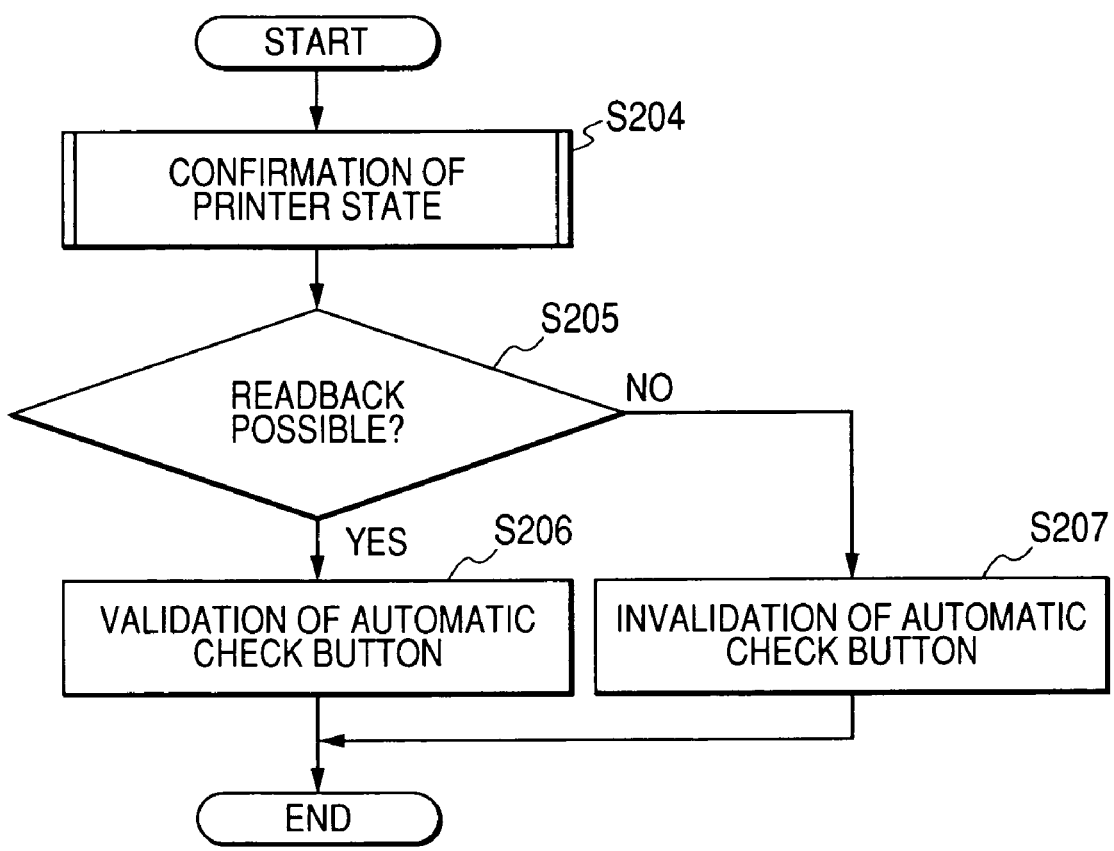
FIG. 11 is a flowchart showing an outline of a program which is executed when a readback tool relating to a second aspect of the invention is activated.
Figure 12:
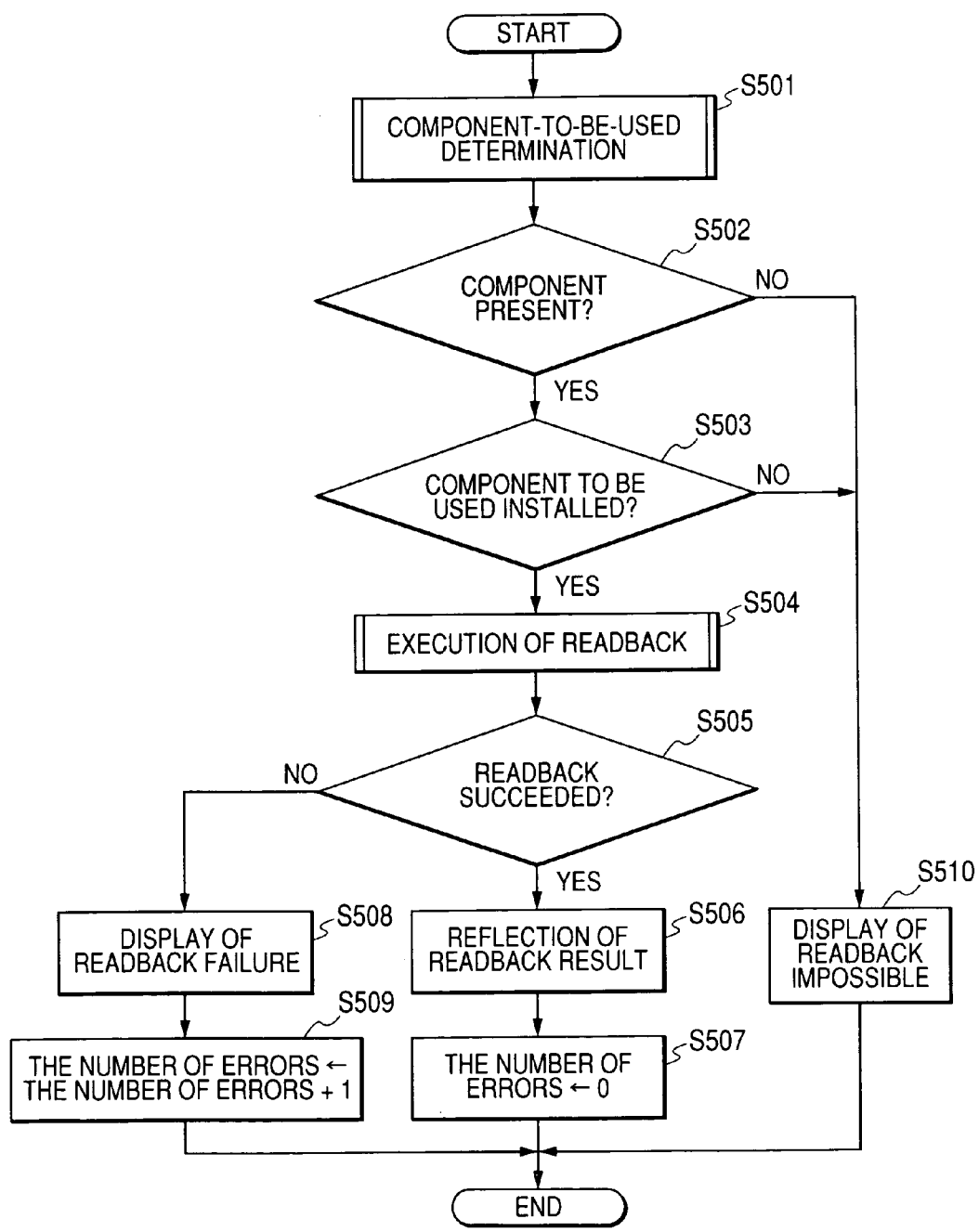
FIG. 12 is a flowchart showing an outline of a processing which is executed when an automatic check button is pressed.

That is, FIG. 11 is a flowchart showing a main control flow (corresponding to FIG. 3 of the first aspect) which is executed when a user interface for starting a readback tool in an information acquisition program and an information acquisition apparatus according to the present aspect is displayed, and FIG. 12 is a flowchart showing the automatic check processing (corresponding to FIG. 6 of the first aspect) in the information acquisition program and the information acquisition apparatus according to the present aspect. The others are the same as the first aspect.

In the present aspect, S201 to S203 are eliminated from the main control flow (see FIG. 11) which is executed when the user interface for starting the readback tool is displayed. In the present aspect, the following steps are added to the automatic check processing flow (see FIG. 12): determining a component tool to be used and determining presence/absence of the determined component tool (S501, S502); determining whether the determined component tool to be used is installed in the PC 10 (S503); and controlling (S510) for indicating that the readback is impossible when it is determined that the determined component tool is absent (S502: NO) or when the determined component tool is not installed in the PC 10 (S503: NO).

Therefore, in the present aspect, S501 functions as the component-to-be-used determining unit; and S510 functions as the warning unit.

(Third Aspect)

Figure 13:
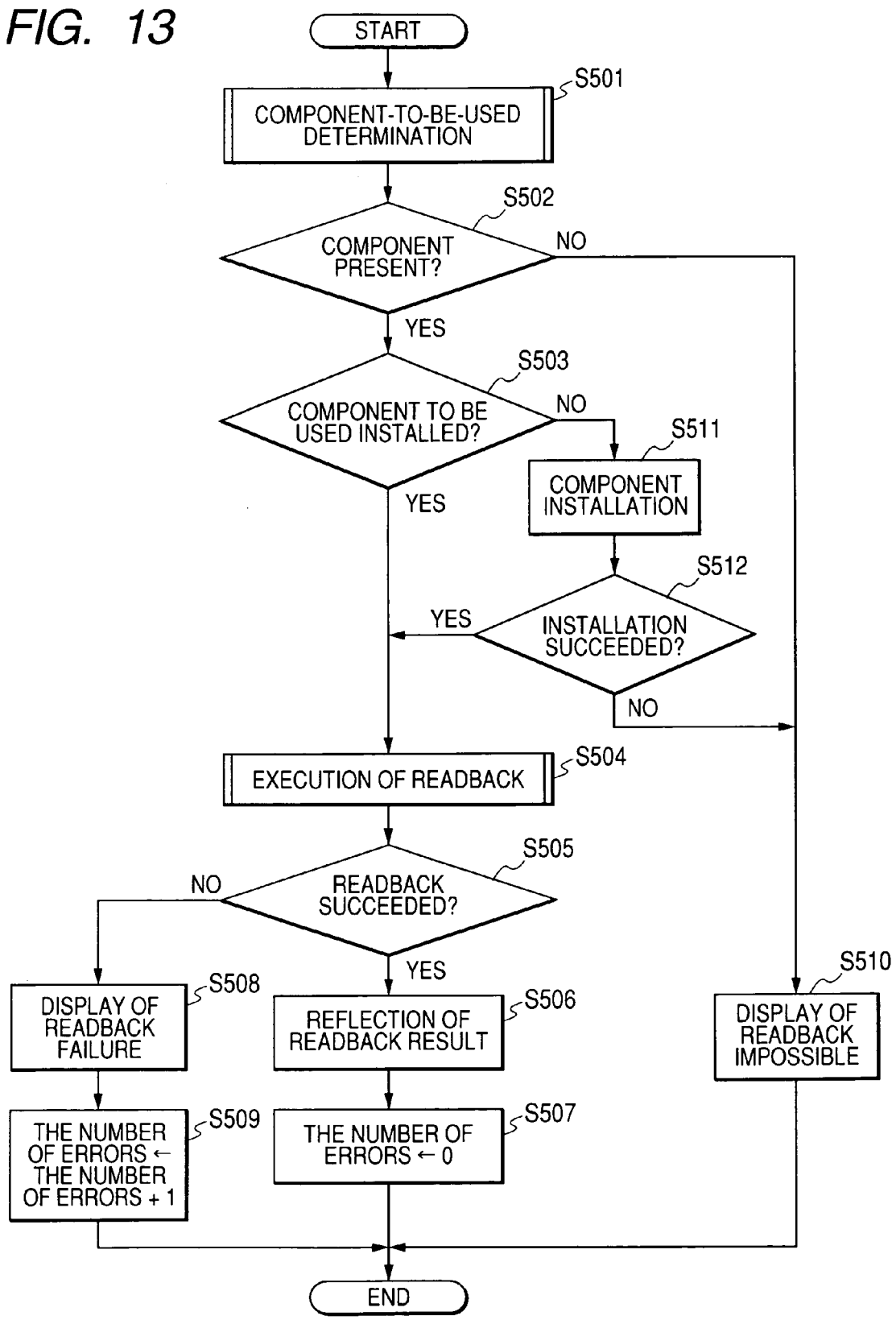
FIG. 13 is a flowchart showing an outline of a program which is executed when a readback tool relating to a third aspect of the invention is activated.

In the first and second aspects, when it is determined that the component tool to be used is not installed in the PC 10 (S203: NO, S503: NO), it is warned that the automatic check button 706 cannot be pressed or the readback is impossible, and the readback is controlled to be impossible. However, in the present aspect, as shown in FIG. 13, when it is determined that the component tool to be used is not installed in the PC 10 (S503: NO), a program for installing the component tool (S511) is executed.

FIG. 13 is a flowchart showing a main control flow (corresponding to FIG. 12 of the second aspect) of an information acquisition program and an information acquisition apparatus according to the present aspect. The others are the same as the first or second aspect.

That is, in S511, a window for urging an assignment of a place, where the component tool to be used is stored, is displayed, and the component tool is installed when the user assigns the storing place.

In S512, it is determined whether installation of the component tool has succeeded. This determination 1 is made because there are cases where no component tool exists at the storing place, the installation of the component tool fails owing to shortage of the capacity of the HDD, or the installation is cancelled by the user's decision.

The step proceeds to S504 when the installation has succeeded, the step proceeds to S510 when the installation has failed or been cancelled.

Incidentally, the HDD 16 or a specific pass on a server, a place where an information recording medium such as a CD-ROM is equipped, a URL on the Internet, or the like is conceived as the place where the component tool to be used is stored.

Thus, in the present aspect, since the component tool to be used is installed in the PC 10 when the component tool to be used is not installed in the PC 10, the information of the printer 20 can always be easily acquired.

Moreover, as clearly described above, S511 functions as the installing unit.

(Fourth Aspect)

In the first to third aspects, when the component tool to be used is determined, it is determined whether the connection method is the same as the current connection method (S304) and then it is determined whether the type of information is the same as the information to be acquired (S305). However, in the present aspect, the priority is put on the determination of the type of information (S305) over the determination of the connection method (S304).

Figure 14:
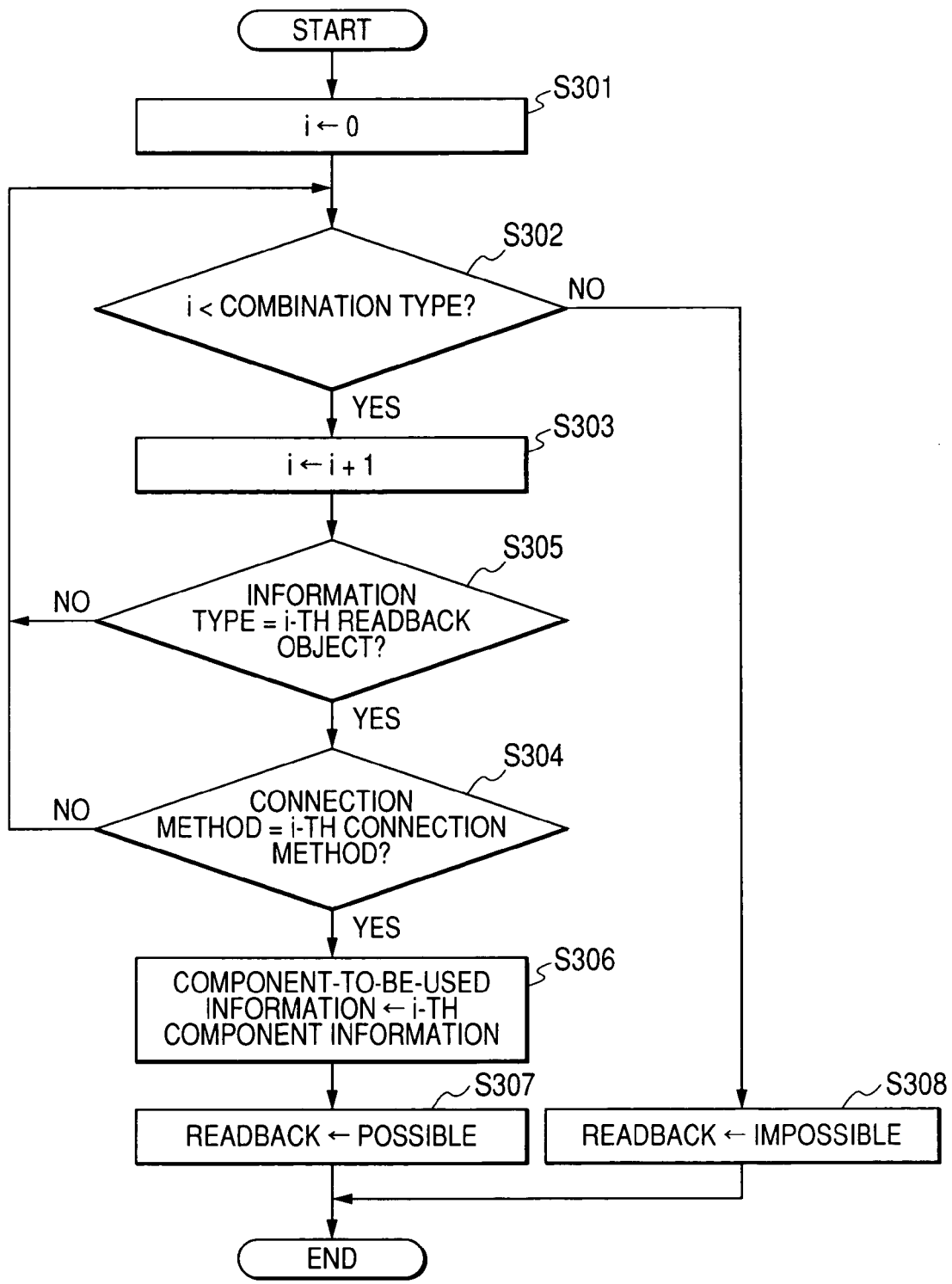
FIG. 14 is a flowchart showing an outline of a control flow for determining a component tool to be used according to a fourth aspect of the invention.

That is, FIG. 14 is a flowchart showing a determination flow (corresponding to FIG. 4 of the first aspect) of a component tool used for an information acquisition program and an information acquisition apparatus according to the present aspect. In the present aspect, as shown in FIG. 14, the determination of the type of information (S305) is executed in advance of the determination of the connection method (S304).

Moreover, flows other than the determination flow of the component tool to be used are the same as any of the first to third aspects.

(Other Aspect)

In the above aspects, although the whole automatic check button 706 is displayed in gray so that the user is warned that the pressing of the automatic check button 706 is impossible, the present invention is not limited to this. For example, the display form (character, shape or the like) of the automatic check button 706 may be made to differ from the case where the pressing of the automatic check button 706 is possible, or the automatic check button 706 itself may be made as non-display.

Additionally, in the above aspects, although the simple printer 20 has been described as an example of the electronic apparatus connected to the computer, the present invention is not limited to this. A multipurpose printer may be employed which includes a so-called facsimile function, and a scanner function for reading characters or an image recorded on a sheet, etc., and for electronizing the read information in addition to a printer function (printing function) as the electronic apparatus.

Further, an option information setting user interface is not limited to that shown in FIG. 2.

Furthermore, combinations of the types of information and the connection methods of the printer 20 (electronic apparatus) are not limited to that shown in FIG. 8.

Additionally, in the above aspects, although the information acquisition apparatus according to the present invention is constituted by incorporating the information acquisition program a into an all-purpose computer, the present invention is not limited to this. For example, the information acquisition apparatus may be constituted by an exclusive computer constituted by an exclusive hardware for operating similarly to the information acquisition program.

Additionally, the present invention is not limited to the above aspects as long as the purpose of the invention disclosed in the claims is satisfied.

What is claimed is:

1. A non-transitory computer-readable storage medium having a computer program stored thereon and that is readable by a computer to which a plurality of component tools are installable and which comprises a plurality of connection ports and a storage unit, each connection port being connectable to a printer having first unique information and second unique information, and the storage unit storing a table associating the first unique information and the second unique information with the component tools and associating the connection ports with the component tools, respectively, the component tools being configured to acquire the first unique information and the second unique information, and the computer program, when executed by the computer, causing the computer to perform operations comprising:
    selecting, as target information, one of the first unique information and the second unique information of the printer connected to one of the plurality of connection ports;
    when the target information is selected, determining one of the component tools for acquiring the target information by referring to the table and:
        determining which one of the plurality of connection ports used in the table matches the connection port to which the printer is connected,
        determining which one of the first and second unique information matches the target information, and
        determining that the one of the component tools for acquiring the target information is a component tool that corresponds to the one of the plurality of connection ports and the one of the first and second unique information in the table;
    when the one of the component tools is determined, determining whether the one of the component tools is installed in the computer and determining whether the computer is communicably connected to the printer;
    displaying a user interface, wherein:
        the user interface is displayed in a first mode in which an automatic check button is enabled if it is determined that the one of the component tools is installed and the computer is communicably connected to the printer, and
        the user interface is displayed in a second mode in which the automatic check button is disabled if it is determined that the one of the component tools is not installed or the computer is not communicably connected to the printer;
    in the first mode:
        acquiring the target information from the printer connected to the one of the connection ports by operating the one of the component tools when the automatic check button is operated through the user interface, and
        displaying a value of the acquired target information in the user interface when the target information is successfully acquired; and
    in the second mode:
        receiving the value of the target information as input via an input receiving device; and
        displaying the received value of the target information in the user interface.

2. The storage medium according to claim 1, wherein the operations further comprise:
    warning that the target information cannot be acquired when it is determined that the one of the component tools is not installed in the computer.

3. The storage medium according to claim 1, wherein the operations further comprise:
    installing the one of the component tools in the computer when it is determined that the one of the component tools is not installed in the computer.

4. The storage medium according to claim 1, wherein when determining one of the component tools, priority is put on the connection ports over which one of the first unique information and the second unique information is selected as the target information, to determine one of the component tools.

5. The storage medium according to claim 1,
    wherein the table comprises a plurality of items, each having one of the connection ports, one of the first unique information and the second unique information, and one of the component tools,
    wherein the determining of the component tools comprises determining, for each item, whether either one of the first unique information and the second unique information of the item matches the target information and the connection port of the item matches the connection port for the printer.

6. The storage medium according to claim 1,
    wherein the table comprises a plurality of items, each having one of the connection ports, one of the first unique information and the second unique information, and one of the component tools,
    wherein the determining of one of the component tools comprises:
        sequentially determining, for each item, whether either one of the first unique information and the second unique information of the item matches the target information, and
        when either one of the first unique information and the second unique information of one of the items matches the target information, determining whether the connection port of the one of the items match the connection port for the printer.

7. The storage medium according to claim 1, wherein, when determining one of the component tools, priority is placed on whichever one of the first unique information and the second unique information is selected as the target information over the connection ports to determine one of the component tools.

8. The storage medium according to claim 1, wherein:
the table further associates the first unique information and the second unique information with operation parameters and associates the connection ports with the operation parameters, respectively;
when the target information is selected, the operations further comprise determining one of the operation parameters by referring to the table, based on which one of the first unique information and the second unique information is selected as the target information and to which port the printer is connected; and
the acquiring of the target information is performed by operating one of the component tools according to the determined one of the operation parameters.

9. The storage medium according to claim 8, wherein:
each of the operation parameters comprises a time-out time, and
when the target information is not acquired within the time-out time, the operations further comprise warning that acquiring of the target information failed.

10. The storage medium according to claim 1, wherein:
the printer comprises a print part and a sheet feed tray, and
the first unique information comprises tray information on the sheet feed tray, and
the second unique information comprises color correction information of the print part.

11. The storage medium according to claim 1, wherein the computer program, when executed by the computer, causes the computer to perform operations further comprising, in the first mode:
receiving the value of the target information as input via an input receiving device; and
displaying the received value of the target information in the user interface.

12. An information acquisition apparatus to which a plurality of component tools are installable, the apparatus comprising:
a plurality of connection ports, each being connectable to a printer that has first unique information and second unique information;
a storage unit that is configured to store a table associating the first unique information and the second unique information with the component tools and associating the connection ports with the component tools, respectively;
a selecting unit that is configured to select, as target information, one of the first unique information and the second unique information of the printer connected to one of the plurality of connection ports;
a first determining unit that is configured to:
determine, when the selecting unit selects the target information, one of the component tools for acquiring the target information by referring to the table and:
determining which one of the plurality of connection ports used in the table matches the connection port to which the printer is connected,
determining which one of the first and second unique information matches the target information, and
determining that the one of the component tools for acquiring the target information is a component tool that corresponds to the one of the plurality of connection ports and the one of the first and second unique information in the table;
a second determining unit that is configured to determine whether the one of the component tools is installed in the information acquisition apparatus;
a connection state inspecting unit that is configured to determine whether the information acquisition apparatus is communicably connected to the printer;
a displaying unit that is configured to display a user interface, wherein:
the displaying unit is configured to display the user interface in a first mode in which an automatic check button is enabled if the second determining unit determines that the one of the component tools is installed and the connection state inspecting unit determines that the information acquisition apparatus is communicably connected to the printer, and
the displaying unit is configured to display the user interface in a second mode in which the automatic check button is disabled if the second determining unit determines that the one of the component tools is not installed or the connection state inspecting unit determines that the information acquisition apparatus is not communicably connected to the printer;
a readback unit that is configured to acquire the target information from the printer connected to the one of the connection ports by operating the one of the component tools when the automatic check button is operated through the user interface in the first mode, wherein, if the readback unit successfully acquires the target information, the display unit displays the value of the acquired target information in the user interface, and
a receiving unit that is configured to receive a value of the target information as input through the user interface in the second mode, wherein the display unit displays the received value of the target information in the user interface.

13. The information acquisition apparatus according to claim 12, further comprising:
a warning unit that is configured to warn that the target information cannot be acquired when the second determining unit determines that the one of the component tools is not installed.

14. The information acquisition apparatus according to claim 12, further comprising:
an installing unit that is configured to install the one of the component tools in the information acquisition apparatus when the second determining unit determines that the one of the component tools is not installed.

15. The information acquisition apparatus according to claim 12, wherein the first determining unit is configured to put priority on the connection ports over which one of the first unique information and the second unique information is selected as the target information, to determine the one of the component tools.

16. The information acquisition apparatus according to claim 12, wherein, when determining one of the component tools, priority is placed on whichever one of the first unique information and the second unique information is selected as the target information over the connection ports to determine one of the component tools.

17. The information acquisition apparatus according to claim 12, wherein:
the table further associates the first unique information and the second unique information with operation parameters and associates the connection ports with the operation parameters, respectively;
the apparatus further comprises a parameter determining unit that is configured to determine, when the selecting unit selects the acquiring target information, one of operation parameters by referring to the table, based on which one of the first unique information and the second unique information is selected as the target information and to which port the printer is connected; and the readback unit is configured to acquire the target information by operating one of the component tools according to the determined one of the operation parameters.

18. The information acquisition apparatus according to claim 17, wherein:

each of the operation parameters comprises a time-out time, and the apparatus further comprises a warning unit that is configured to warn that the acquiring of the target information failed when the target information is not acquired within the time-out time.

19. The information acquisition apparatus according to claim 12, wherein:

the printer comprises a print part and a sheet feed tray, and the first unique information comprises tray information on the sheet feed tray, and the second unique information comprises color correction information of the print part.

20. The information acquisition apparatus according to claim 12, wherein the receiving unit is further configured to receive a value of the target information as input through the user interface in the first mode, wherein the display unit displays the received value of the target information in the user interface.

* * * * *